United States Patent
Sonobe

[11] Patent Number: 5,826,108
[45] Date of Patent: Oct. 20, 1998

[54] DATA PROCESSING SYSTEM HAVING MICROPROCESSOR-BASED BURST MODE CONTROL

[75] Inventor: Satoru Sonobe, Tokyo, Japan

[73] Assignee: NEC Corporation, Tokyo, Japan

[21] Appl. No.: 526,090

[22] Filed: Sep. 11, 1995

[30] Foreign Application Priority Data

Sep. 9, 1994 [JP] Japan .................................. 6-240847

[51] Int. Cl.⁶ ................................................ G06F 13/28
[52] U.S. Cl. ............................... 395/855; 395/849; 711/1
[58] Field of Search .................................. 395/400, 473,
395/403, 500, 189.01, 821, 855, 842, 849;
365/230; 711/1

[56] References Cited

U.S. PATENT DOCUMENTS

| | | | |
|---|---|---|---|
| 5,014,188 | 5/1991 | Kawamura | 395/403 |
| 5,261,064 | 11/1993 | Wyland | 395/400 |
| 5,386,385 | 1/1995 | Stephens, Jr. | 365/189.05 |
| 5,386,579 | 1/1995 | Bourekas et al. | 395/800 |
| 5,392,239 | 2/1995 | Margulis et al. | 395/189.01 |
| 5,453,957 | 9/1995 | Norris et al. | 365/230.04 |
| 5,463,760 | 10/1995 | Hamauchi | 395/500 |
| 5,502,828 | 3/1996 | Shah | 395/403 |
| 5,526,320 | 6/1996 | Zagar et al. | 365/233.5 |
| 5,539,696 | 7/1996 | Patel | 365/189 |
| 5,586,289 | 12/1996 | Shah | 395/473 |
| 5,598,376 | 1/1997 | Merritt et al. | 365/230.06 |

OTHER PUBLICATIONS

"Am29000", *32–bit Microcomputer: Application, Development and Evaluation*, Nikkei McGraw–Hill, pp. 291–302 (1988).

*Primary Examiner*—Christopher B. Shin
*Attorney, Agent, or Firm*—Foley & Lardner

[57] ABSTRACT

A data processing system includes a microprocessor and a memory coupled to each other, and has a burst access function in which, when an active burst request signal is supplied to the memory, only a first address is outputted to the memory, so that a plurality of items of data are accessed sequentially from the first address. A memory region of the memory is divided into a plurality of memory blocks, and the microcomputer includes a register for storing burst access/single access information for each of the memory blocks, and a decoder receiving an address to be outputted to the memory for knowing to which memory block a memory region to be accessed belongs. When the memory region to be accessed is a memory block for the burst access, a burst request signal is activated.

7 Claims, 7 Drawing Sheets

DATA PROCESSING SYSTEM HAVING MICROPROCESSOR-BASED BURST MODE CONTROL

BACKGROUND OF THE INVENTION

1. Field of the Invention

The present invention relates to a data processing system, and more specifically to a data processing system capable of performing a data transfer in a burst access mode.

2. Description of Related Art

In general, a memory access for accessing a plurality of data at continuous addresses by outputting only a first address, is called a "burst access". In this burst access, an increment of an address is generally assigned to a memory side, so that it is sufficient if only the first address is transferred one time for a plurality of data. Therefore, a delay in the time for outputting all address from a processor becomes small, so that a high speed access becomes possible.

Referring to FIG. 1, there is shown one conventional example of the burst access, which is a system construction used in a 32-bit RISC computer Am 29000 available from Advanced Micro Devices (described in Japanese language book "32-bit Microcomputer: Application, Development and Evaluation", Appendix, "Produce Report: Am29000", pp291–302, published from Nikkei McGraw-Hill, 1988).

The system shown in FIG. 1 includes a microcomputer 12, an instruction memory 22 and a data memory 30, which are coupled to a 32-bit address bus 42 and a 32-bit data bus 52. In addition, the microcomputer 12 and the instruction memory 22 are coupled to each other through a 32-bit instruction bus 51. The instruction memory 22 stores instruction to be executed by the microcomputer 12.

Am29000 is configured to be able to make the burst access to both of the data bus 52 and the instruction bus 51, but, for simplification of explanation, FIG. 1 shows only signals for the burst access to the instruction bus 51.

The microcomputer 12 outputs to the instruction memory 22 a system clock SYSCLK 90, an instruction access request signal $\overline{IREQ}$ 91 activated when a valid address is outputted onto the address bus, and a burst access request signal $\overline{IBREQ}$ 92 for requesting the burst access of instructions. While the burst access request signal $\overline{IBREQ}$ 92 is active, instructions are sequentially outputted from the memory. On the other hand, the instruction memory 22 outputs to the microcomputer 12 a burst access acknowledge signal $\overline{IBACK}$ 93 activated when an instruction access in a burst mode is possible, and a ready signal $\overline{IRDY}$ 94 indicative of existence of a valid instruction on the instruction bus 51. Here, the upper bar indicates that the signal concerned is active when it is at a low level (low active).

In the example, the address bus 42 is used in common to both of the data access and the instruction access.

Now, operation of the burst access will be described with reference to FIG. 2, which illustrates a timing chart of the burst access mode in the conventional example.

First, signals shown in FIG. 2 will be explained. SYSCLK shows the system clock 90. A31-0 indicates signals on the access bus 42, and I31-0 designates signals on the instruction bus 51. $\overline{IREQ}$ shows the instruction access request signal 91 controlled in such a manner that when the instruction access request signal 91 is active, a valid address is outputted onto the address bus. $\overline{IBREQ}$ indicates the burst access request signal 92 for the instruction bus (I31-0) 51. $\overline{IBACK}$ designates the burst access acknowledge signal 93 indicating that the instruction access in the burst mode is possible. $\overline{IRDY}$ shows the ready signal 94 indicative of existence of a valid instruction on the instruction bus (I31-0) 51.

The parenthesized "in" and "out" in FIG. 2 shows the direction of a signal viewed from the microcomputer 12. Namely, the parenthesized "in" shows a signal supplied to the microcomputer 12, and the parenthesized "out" shows a signal outputted from the microcomputer 12.

Referring to FIG. 2, in a state 1, the instruction access request signal $\overline{IREQ}$ 91 is activated, an "address N" is outputted to the address bus (A31-0) 42.

In addition, the burst access request signal $\overline{IBREQ}$ 92 is activated to request the burst access to the instruction memory 22.

Here, it is to be noted that when an empty occurs in an internal prefetch buffer (not shown) of the microcomputer 12, the microcomputer 12 attempts to execute the burst access by activating the burst access request signal $\overline{IBREQ}$ 92.

If the instruction memory 22 supports the burst access by having an automatic instrument function of the address and others, when a preparation for complying with the burst access is completed (in a state 2 in FIG. 2), the instruction memory 22 activates the burst access acknowledge signal $\overline{IBACK}$ 93.

In response to the burst access acknowledge signal $\overline{IBACK}$ 93, the microcomputer 12 inactivates the instruction access request signal $\overline{IREQ}$ 91 in a state 3, and also, terminates the supplying of the "address N".

Thus, a continuous access of instructions from the instruction memory 22 starts.

In a state in which a first instruction "n" is established on the instruction bus (I31-0) 51, the ready signal $\overline{IRDY}$ 94 is activated, so that the first instruction "n" is transferred to the microcomputer 12.

Incidentally, if the instruction memory 22 does not support the burst access, the burst access acknowledge signal $\overline{IBACK}$ 93 remains inactive, and at the moment the instruction "n" has been established, the ready signal $\overline{IRDY}$ 94 is activated, and the transfer is completed. This is a single access, and the microcomputer 12 outputs an address for each access to the instruction.

In a state 5, a next instruction "n+1" is transferred as the result of a continuation of the burst access, but since a cause of interrupting the burst access occurs in the microcomputer 12, the burst access request signal $\overline{IBREQ}$ 92 is inactivated so as to request interrupt of the burst access to the instruction memory 22.

In response to the inactivated burst access request signal $\overline{IBREQ}$ 92, the instruction memory 22 inactivates the ready signal $\overline{IRDY}$ 94, so as to interrupt the transfer of the instruction.

In a state 7, the microcomputer 12 activates the burst access request signal $\overline{IBREQ}$ 92, again, so that the burst access is restarted. The ready signal $\overline{IRDY}$ 94 is activated, and the transfer of the instruction "n+2" is waited.

In a state 8, since a cause for terminating the burst access occurs in the microcomputer 12, the burst access request signal $\overline{IBREQ}$ 92 is inactivated, so that the burst access is terminated.

In addition, in a state 8, an "address M" is outputted onto the address bus (A31-0) 42, and the instruction access request signal $\overline{IREQ}$ 91 is activated, and also, the burst access request signal $\overline{IBREQ}$ 92 is activated for starting a next burst access.

Thus, the microcomputer 12 activates the burst access request signal IBREQ 92 so as to attempt the burst access to a possible extent, and as soon as the burst access acknowledge signal IBACK 93 is activated, the microcomputer 12 enters the burst access mode.

However, if the instruction memory 22 is in a condition incapable of complying with the burst access, or does not support the burst access, since the burst access acknowledge signal IBACK 93 remains inactive, the single access is performed.

As shown in FIG. 2, in the burst access mode, after the first address "N" has been processed, the instructions are accessed at a rate of one access per one cycle (one state).

In the burst access mode, in addition, when there occurs a cause for interrupting the burst access, as when the internal prefetch buffer (not shown) of the microcomputer 12 is no longer empty, or when there occurs a cause for terminating the burst access, because of execution of a branch instruction, the microcomputer 12 inactivates the burst access request signal IBREQ 92 so as to notify the termination of the burst access to the instruction memory 22.

On the other hand, in the case that the instruction memory 22 is composed of a DRAM, when there occurs a cause of terminating the burst access because of a refresh operation from an external device, the burst access acknowledge signal IBACK 93 is inactivated, so that the microcomputer 12 terminates the burst access.

When the burst access should be interrupted, namely, when a Bait should be made because the instruction memory 22 cannot supply an instruction, the ready signal IRDY 94 is inactivated, so that a wait cycle is inserted in the instruction access cycle. Thereafter, at the moment the ready signal IRDY 94 is activated, the microcomputer 12 fetches the instruction.

In the burst access mode, in other words, the instructions (data) are sequentially transferred until either the microcomputer 12 or the instruction memory 22 interrupts or terminates the instruction (data) access.

In the single access, the access is terminated when the ready signal IRDY 94 is activated.

As mentioned above, the microcomputer 12 and the instruction memory 22 are synchronized for the burst access by the burst access request signal IBREQ 92, the burst access acknowledge signal IBACK 93, and the ready signal IRDY 94.

In other words, the conventional data processing system having a burst access system is so configured that the instruction memory 21 responds to the burst access request signal IBREQ 92 from the microcomputer 12 so as to generate the burst access acknowledge signal IBACK 93, and the ready signal IRDY 94 from two different terminals.

In order to attempt the burst access to a greatest possible extent, the microcomputer 12 activates the burst access request signal IBREQ 92. In this case, if the instruction memory 22 supports the burst access, the burst access acknowledge signal IBACK 93 is activated so as to start the burst access. On the other hand, if the instruction memory 22 does not support the burst access, the burst access acknowledge signal IBACK 93 remains inactive, and therefore, the single access is performed.

As also mentioned hereinbefore, the ready signal IRDY 94 is a signal for notifying to the microcomputer 12 from the instruction memory 22 that the instruction is established.

In general, when a memory system is provided, in most cases a DRAM, an SRAM, a ROM and an input/output device are included in mixed condition. The above mentioned burst access system is most effectively and easily utilized when the memory system includes the DRAM having a page access mode and a synchronous DRAM.

However, since the SRAM and ROM require a complicated interface circuit containing a counter, that in some cases that the SRAM and ROM are not suitable to the burst access.

Therefore, in providing the above mentioned different types of memories in the memory system, there is required a means for notifying to the microcomputer in which address space there is located a memory capable of performing the burst access.

In the above mentioned conventional example, the instruction memory 22 generates the burst access acknowledge signal IBACK 93 at each access, as seen from FIG. 2. However, with a recent increase of the operating frequency of the microcomputer 12, the time required for the address decoding for generation of the burst access acknowledge signal IBACK 93 and for the signal propagation, becomes severe, with the result that it becomes difficult to realize the requirement in the system. In brief, because of the increased operating frequency, in order to generate the burst access acknowledge signal IBACK 93, it is required that an address outputted onto the address bus 42 from the microcomputer 12 is decoded by an extremely high speed address decoder, and also, a time margin allowed to the signal in connection with a setup time, a hold time and a signal propagation delay, becomes extremely severe. Therefore, a timing design in the system becomes very difficult.

SUMMARY OF THE INVENTION

Accordingly, it is an object of the present invention to provide a data processing system which has overcome the above mentioned defect of the conventional one.

Another object of the present invention is to provide a data processing system which has simplified and quickened a control required for the burst access and a handshake between the data processing system and a memory, so that the burst access can be realized in a system having an increased operating frequency.

The above and other objects of the present invention are achieved in accordance with the present invention by a data processing system having a single access mode in which one item of data is accessed in response to reception of one address and a burst access mode in which a plurality of items of data are continuously accessed in response to reception of one address, the data processing system comprising:

memory means storing mode information designating which of the single access mode and the burst access mode should be selected for a given address region; and means for outputting, in accordance with the mode information stored in the memory means, a mode signal indicative of whether an access to be performed is the single access mode or the burst access mode.

According to another aspect of the present invention, there is provided a data processing system having a memory means having a single access mode in which one item of data is outputted in response to reception of one address and a burst access mode in which a plurality of items of data are continuously outputted with reception of a burst request signal and one address, the data processing system comprising:

a register storing information about which of the single access mode and the burst access mode should be selected for the memory means; and means for activating the burst request signal to the memory means to be accessed, when the information stored in the register designates the burst access.

According to still another aspect of the present invention, there is provided a data processing system having a microcomputer and a memory means coupled to each other, the memory means having a single access mode in which one item of data is outputted in response to reception of one address and a burst access mode in which a plurality of items of data are continuously outputted with reception of a burst request signal and one address, a memory region of the memory means being divided into a plurality of memory blocks, the microcomputer comprising:

a register storing, for each of the memory blocks, information about whether the burst access mode should be made for a corresponding memory block, an address decode means receiving an address to be supplied to the memory means, for outputting a decode signal indicative of which of the plurality of memory blocks corresponds to a memory region to be accessed by the address to be supplied to the memory means; and means for activating the burst signal to be supplied to the memory means, when the information stored in the register designated by the decode signal indicates the burst access.

Preferably, the address decode means receives an internal address signal on an internal address bus, for selecting one of of the plurality of memory blocks. In addition, a content of the register is set by execution of a predetermined instruction by a central processing unit.

In a preferred embodiment, the microcomputer outputs to the memory means the burst request signal for requesting the burst access mode and a data request signal for requesting the memory means to output data, and the microcomputer receives from the memory means a signal indicating that data is established on a data bus.

In addition, the microcomputer includes a plurality of AND gates each receiving information stored in the register and a corresponding decode signal from the address decode means, and an OR gate receiving an output of all the AND gates for outputting the burst request signal.

Furthermore, when the burst request signal is inactive, the microcomputer accesses to the memory means in the single access mode.

In addition, the memory means includes a first memory which supports the burst access mode and a second memory which does not support the burst access mode, and the memory region of the memory means is divided into a plurality of different memory blocks having a predetermined size, and the burst request signal is used as a chip select signal for the first memory which supports the burst access mode, and an inverted signal of the burst request signal is used as a chip select signal for the second memory which does not support the burst access mode.

With the above mentioned arrangement, there is provided the means for selecting either the single access or the burst access for one memory region or each of a plurality of memory regions, and it is no longer necessary to receive a burst access acknowledge signal from an external memory. Therefore, the single access and the burst access can be controlled by only one control signal which is a signal outputted from the microcomputer and indicating the kind of the access.

Therefore, in contrast to the conventional example mentioned hereinbefore so configured that a result (burst access acknowledge signal $\overline{IBACK}$) of an external decoding of an address in response to the burst request signal is fed back to the microcomputer as the burst acknowledge signal, the data processing system in accordance with the present invention includes the access mode designation means internally provided in the microcomputer, so that internally in the microcomputer it is possible to discriminates the kind of the access, namely, the single access or the burst access. Accordingly, a transfer and reception of a signal between an external device and the microcomputer in connection with the kind of the access to be executed, is no longer necessary.

Furthermore, since the kind of the access can be discriminated by using the internal address signal before the address is outputted from the microcomputer, it is possible to greatly reduce the control time in comparison with the conventional example. Therefore, it is very effective in increasing the system operating frequency and in reducing the number of clocks in the access cycle.

In the data processing system in accordance with the present invention, furthermore, since the burst access acknowledge signal $\overline{IBACK}$ is omitted, the number of control terminals of the microcomputer can be reduced by one, and therefore, the package size can be reduced. Additionally, since the address decoder is provided internally in the microcomputer, an external circuit can be reduced, and therefore, it is possible to reduce the package area of the system. As a result, the cost and the consumed electric power of the system can be decreased.

The above and other objects, features and advantages of the present invention will be apparent from the following description of preferred embodiments of the invention with reference to the accompanying drawings.

DESCRIPTION OF THE PREFERRED EMBODIMENTS

Figure 3:
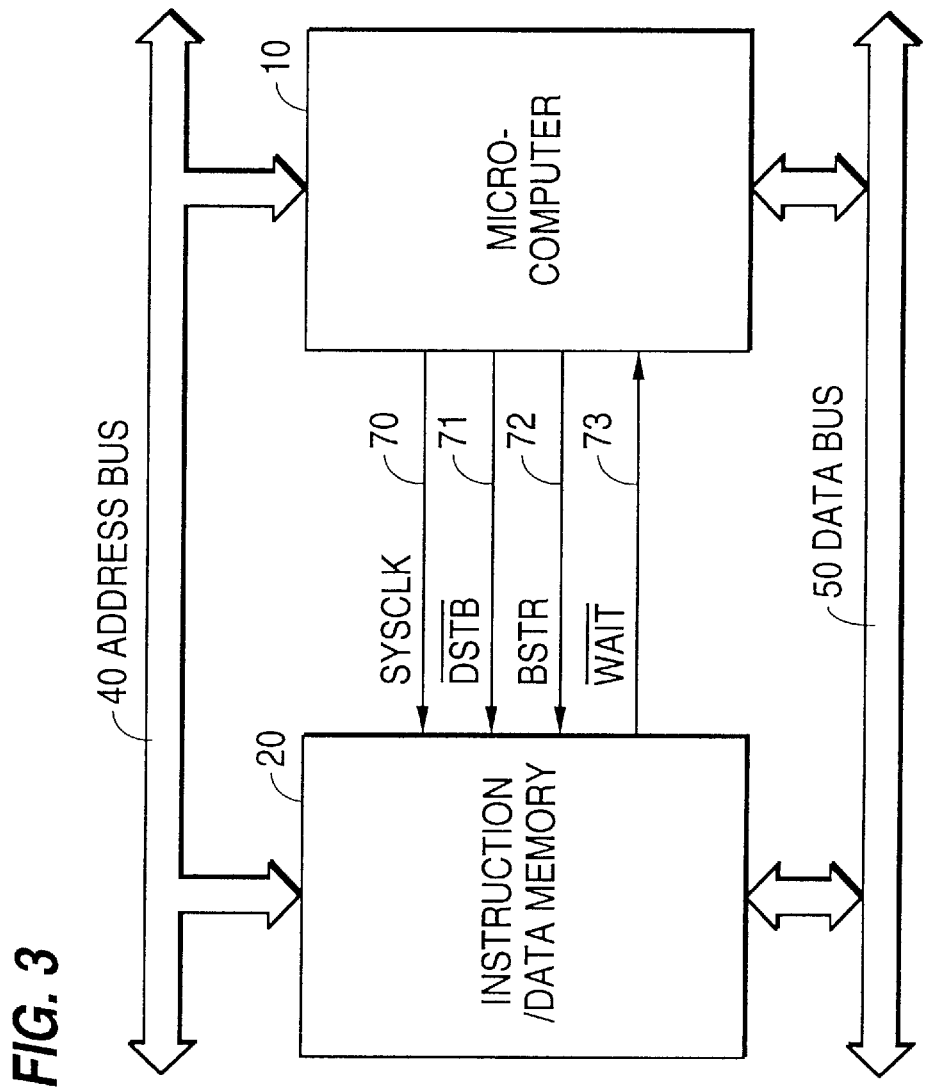
FIG. 3 is a block diagram of a first embodiment of the data processing system in accordance with the present invention, capable of performing the burst access.

Referring to FIG. 3, there is shown a block diagram of a first embodiment of the data processing system in accordance with the present invention, capable of performing the burst access.

Figure 1:
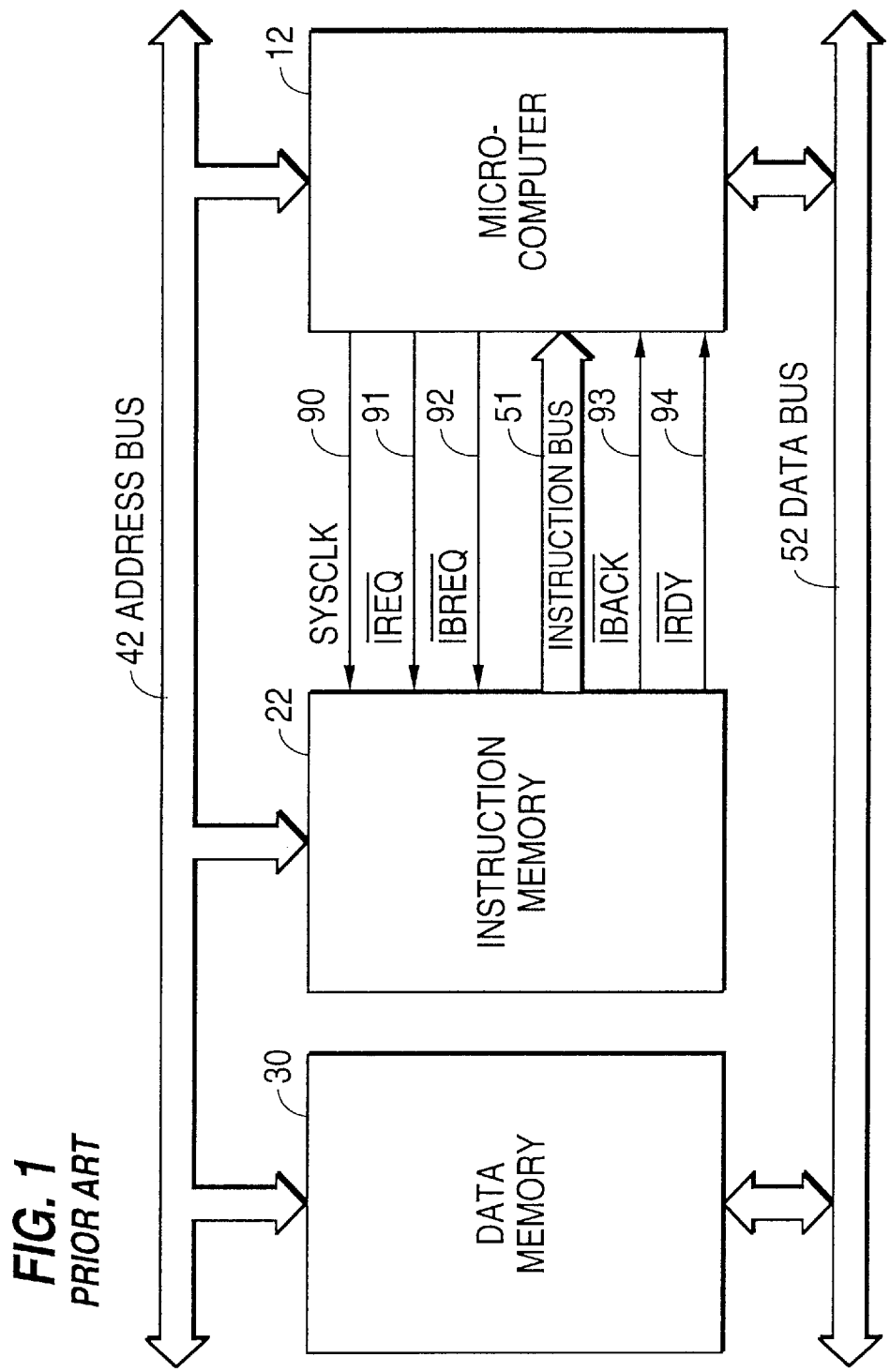
FIG. 1 is a block diagram of one conventional data processing system capable of performing the burst access.
Figure 2:
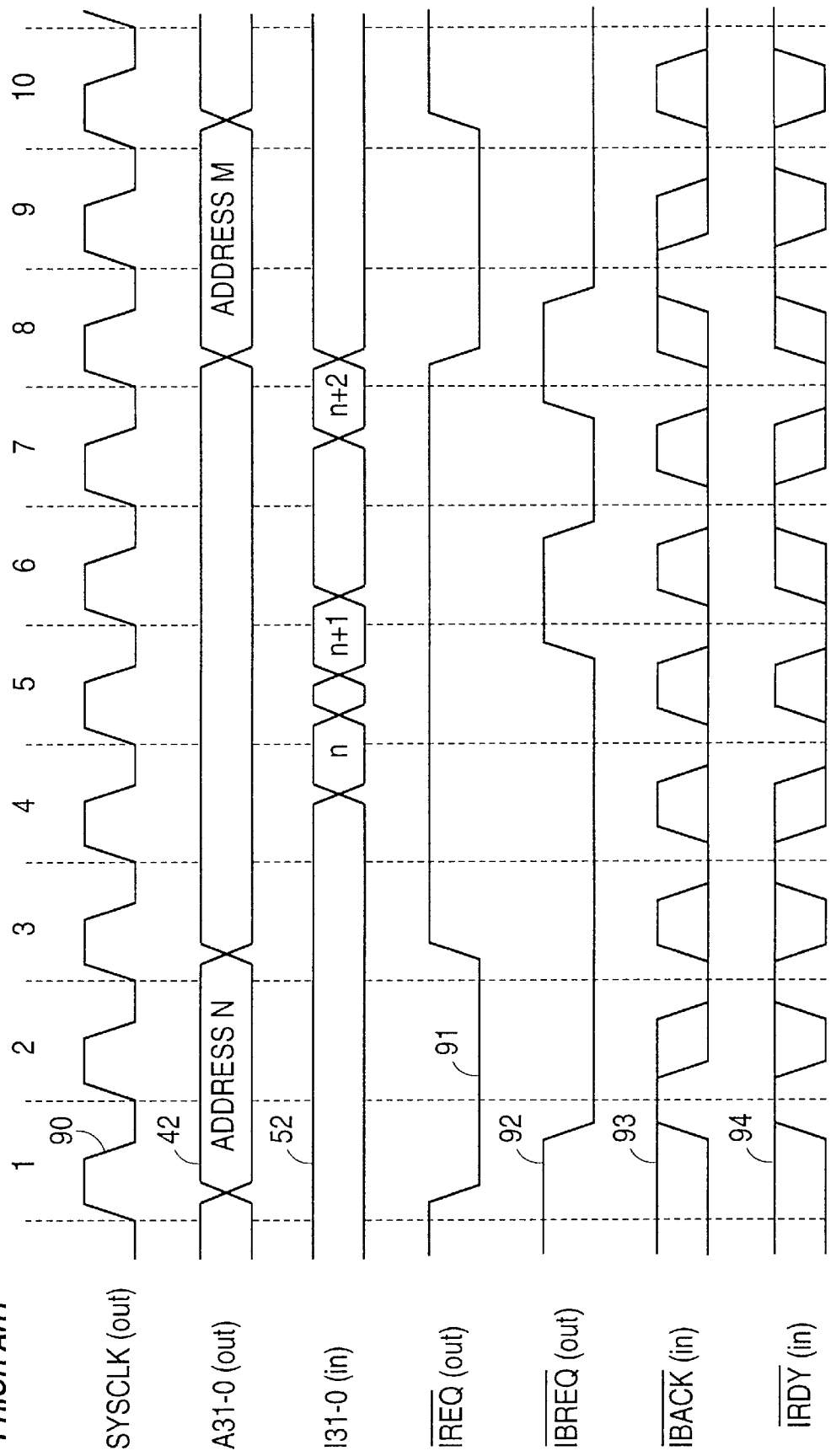
FIG. 2 is a timing chart illustrating an operation in the burst access mode in the conventional data processing system shown in FIG. 1.

Referring to FIG. 3, the shown embodiment includes a microcomputer 10 and an instruction/data memory 20 coupled to an address bus 40 and a data bus 50. In the embodiment shown in FIG. 3, an instruction memory and a data memory are provided as only one memory, but an instruction memory and a data memory may be provided independently of each other, as in the conventional example shown in FIG. 1.

The microcomputer 10 outputs to the instruction/data memory 20 a system clock SYSCLK 70, a data strobe signal $\overline{\text{DSTB}}$ 71, and a burst request signal BSTR 72, and receives a wait signal $\overline{\text{WAIT}}$ 73 from the instruction/data memory 20.

Figure 4:
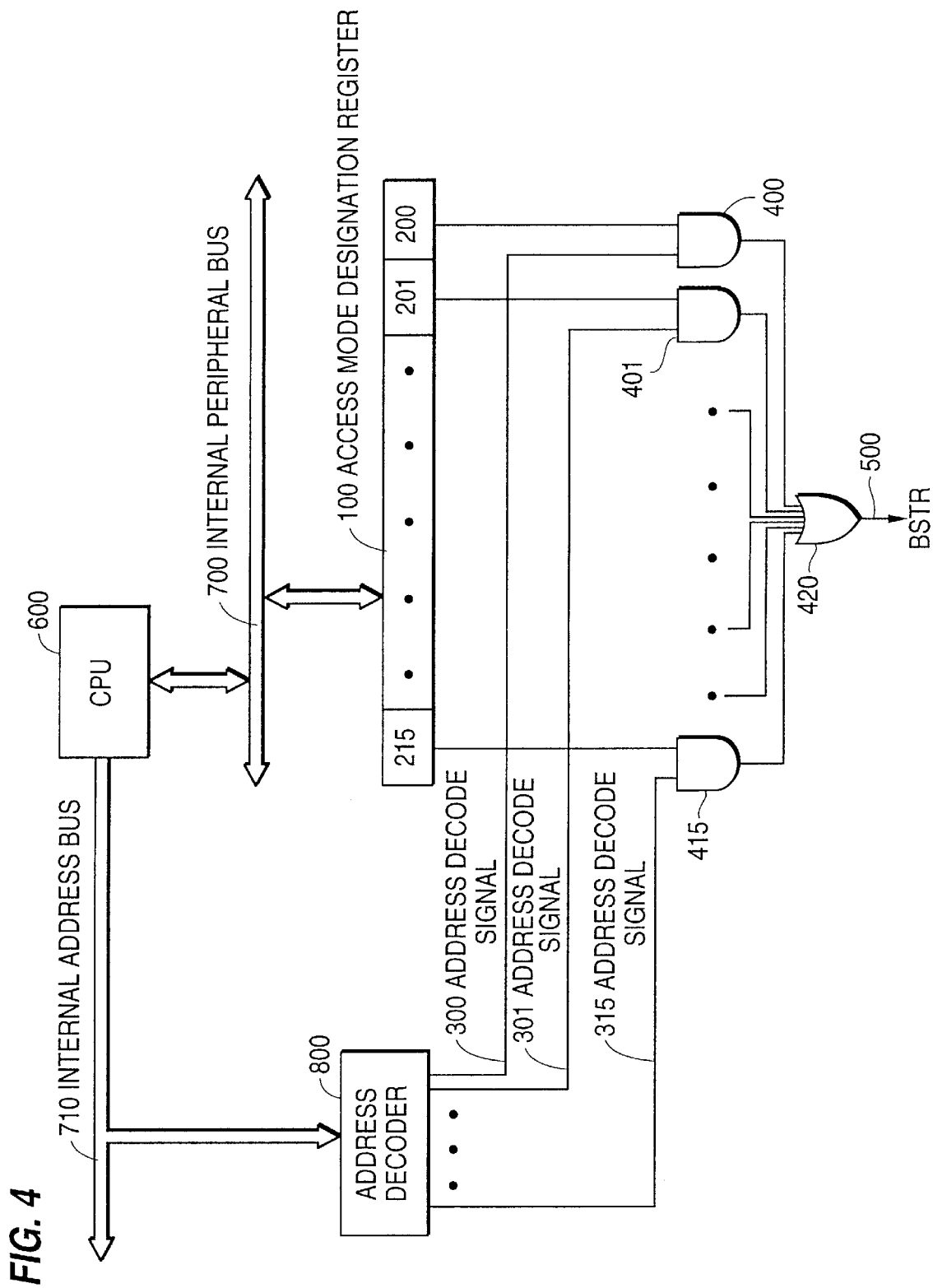
FIG. 4 is a block diagram of an access mode designation register incorporated in the data processing system in accordance with the present invention.

Referring to FIG. 4, there is shown an example of an access mode designation register 100 internally provided in the microcomputer 10. The microcomputer 10 utilizes the access mode designation register 100 for the purpose of designating an access mode, namely, a burst access or a single access for each of a plurality of memory regions.

In the meanwhile, a DRAM (dynamic random access memory), an SRAM (static random access memory), a ROM (read only memory) and I/O (input/output) devices constitute a memory system, and the mapping of respective addresses of these memories and the I/O devices do not change dynamically. Therefore, which of the memory regions is to be accessed in the burst access mode, and which of the memory regions is to be accessed in the single access mode, are previously known. Accordingly, it is possible to designate the access mode internally in the microcomputer 10 by using the access mode designation register 100.

When the burst request signal BSTR 72 is active, the instruction/data memory 20 complies with the burst access, and when the burst request signal BSTR 72 is inactive, the instruction/data memory 20 complies with the single access.

In the conventional example, the right for determining the access mode belongs to the memory side. In the shown embodiment, however, the right for determining the access mode belongs to the microcomputer 10, and accordingly, no signal acknowledging receipt of the burst request signal BSTR 72, is required.

Referring to FIG. 4, the access mode designation register 100 mapped to predetermined addresses of the memory regions, is coupled to a CPU (central processing unit) 600 through an internal peripheral bus 700, so that the content of the access mode designation register 100 can be rewritten by causing the CPU to execute an ordinary store instruction for an address allocated for the access mode designation register 100.

In the shown embodiment, respective bits 200 to 215 of the access mode designation register 100 are assigned to 16 memory blocks obtained by dividing a 16-Mbyte memory region in units of 1 Mbyte.

Namely, each bit of the access mode designation register 100 corresponds to a memory region of 1 Mbyte. For example, the bit 200 (which is the least significant bit of the access mode designation register 100) is allocated to the memory block of 0 to 1 Mbyte, and the bit 201 is allocated to the memory block of 1 Mbyte to 2 Mbyte, and so on.

To the CPU 600, an internal address bus 710 is coupled, and an address signal on the internal address bus 710 is outputted to the external address bus 40 shown in FIG. 3.

An address decoder 800 is coupled to the internal address bus 710 so as to decode the address on the internal address bus 710. Only one of address decode signals 300 to 315 of the address decoder 800 is brought to "1" in accordance with the address on the internal address bus 710, and the other address decode signals are maintained at "0". For example, when the address on the internal address bus 710 is in the range of 0 to 1 Mbyte, the address decode signal 300 is brought to "1". When the address on the internal address bus 710 is in the range of 1 Mbyte to 2 Mbyte, the address decode signal 301 is brought to "1".

The address decode signals 300 to 315 are supplied together with an output of the bits 200 to 215 of the access mode designation register 100 to two-input AND gates 400 to 415, respectively, so as to obtain a logical product between one address decode signal and a corresponding bit of the access mode designation register 100. An output of the AND gates 400 to 415 are connected to an OR gate 420 so as to obtain a logical sum of the output of the AND gates 400 to 415.

Each of the bits 200 to 215 of the access mode designation register 100 is set with "1" when the data access to the corresponding memory block is to be performed in the burst access mode, and with "0" when the data access to the corresponding memory block is to be performed in the single access mode.

Among the bits 200 to 215 of the access mode designation register 100, a bit corresponding to the memory block being currently accessed is selected by cooperation of the address decode signals 300 to 315, the AND gates 400 to 415 and the OR gate 420. Thus, an output 500 of the OR gate 420 is brought to "1" when the memory block to be accessed is designated as the burst access, and to "0" when the memory block to be accessed is designated as the single access. Therefore, the output 500 of the OR gate 420 is outputted as the burst request signal BSTR 72.

Now, explanation will be made on operation when the burst access is designated by the access mode designation register 100, with reference to FIG. 5 which is a timing chart illustrating the operation of the embodiment in the burst access mode.

Figure 5:
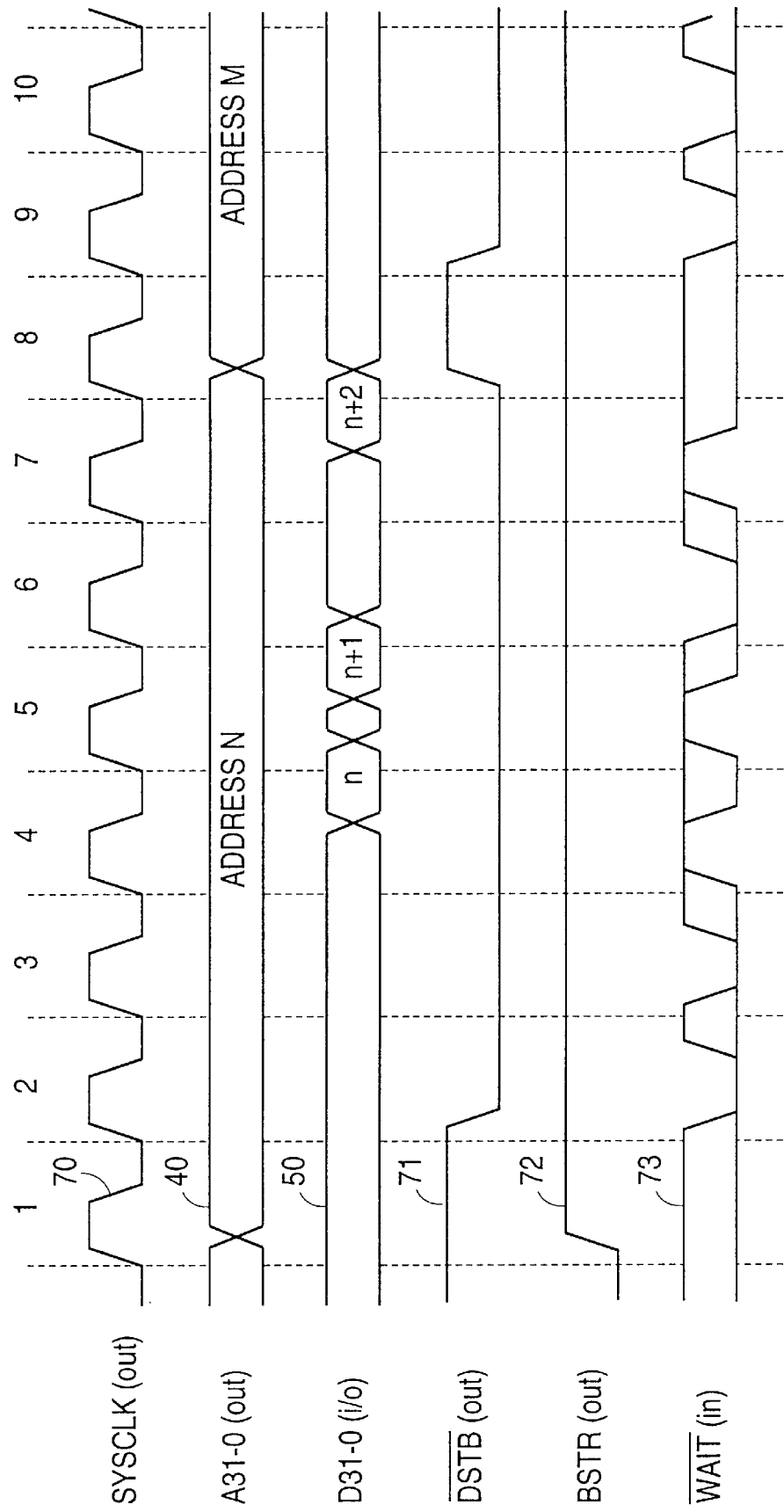
FIG. 5 is a timing chart illustrating an operation in the burst access mode in the first embodiment of the data processing system shown in FIG. 3.

FIG. 5, SYSCLK shows the system clock 70. A31-0 designates an address on the address bus 40, and I31-0 indicates an instruction or data on the data bus 50. $\overline{\text{DSTB}}$ is the data strobe signal 71 requesting the instruction/data memory to output an instruction or data, and BSTR shows the burst request signal 72 activated at the time of the burst access and inactivated at the time of the single access. $\overline{\text{WAIT}}$ indicates the wait signal 73 for inserting a wait into the data access timing.

The parenthesized "in", "out" and "i/o" in FIG. 5 shows the direction of a signal viewed from the microcomputer 10. Namely, the parenthesized "in" shows a signal supplied to the microcomputer 10, and the parenthesized "out" shows a signal outputted from the microcomputer 10. The parenthesized "i/o" shows a signal which is supplied to the microcomputer 10 in some situation and is outputted from the microcomputer 10 in another situation.

In the shown embodiment, the data strobe signal $\overline{\text{DSTB}}$ 71, the burst request signal BSTR 72, and the wait signal $\overline{\text{WAIT}}$ functionally correspond to the instruction access request signal $\overline{\text{IREQ}}$ 91, the burst access request signal $\overline{\text{IBREQ}}$ 92 and the ready signal $\overline{\text{IRDY}}$ 94 in the conventional example explained hereinbefore, respectively. Because of the above mentioned reason, however, the shown embodiment has no signal corresponding to the burst access acknowledge signal $\overline{\text{IBACK}}$ 93.

Referring to FIG. 5, in a state 1, an "address N" is outputted to the address bus A31-0 40, and also, the burst request signal BSTR 72 is activated so as to notify to the instruction/data memory 20 that the access in this cycle is the burst access.

When a preparation for complying with the burst access has been completed in the instruction/data memory 20 (in a state 4 in the example of FIG. 5), the wait signal $\overline{\text{WAIT}}$ 73 is inactivated so that an instruction "n" is outputted onto the data bus 50.

In the microcomputer 10, since it is inhibited to sample an instruction on the data bus 50 while the wait signal $\overline{\text{WAIT}}$ 73 is active, a first instruction "n" is transferred for the first place in the state 4 in which the wait signal $\overline{\text{WAIT}}$ 73 is inactivated.

In a state 5, since the wait signal $\overline{\text{WAIT}}$ 73 is inactive, a next instruction "n+1" is transferred continuously.

In a state 6, since the instruction/data memory 20 had become incapable of supplying the instructions, the wait signal $\overline{\text{WAIT}}$ 73 is activated (namely, is brought to the low level), so that the microcomputer 10 is put into a wait condition.

In a state 7, the instruction/data memory 20 becomes capable of supplying the instructions, the wait signal $\overline{\text{WAIT}}$ 73 is inactivated, and a further next instruction "n+2" is transferred.

In a state 8, a cause of terminating the burst access occurs in the microcomputer 10, and therefore, the data strobe signal $\overline{\text{DSTB}}$ 71 is inactivated so as to notify termination of the burst access to the instruction/data memory 20. In response to the inactivated data strobe signal $\overline{\text{DSTB}}$ 71, the instruction/data memory 20 terminates the transfer in the state 8. Simultaneously, a "next address NM" is outputted to the address bus A31-0 40 in the state 8, so that a next burst access is started.

Thus, when the internal prefetch buffer (not shown) of the microcomputer 10 is no longer empty, or when a cause for terminating the burst access occurs as the result of execution of a branch instruction by the CPU 600, the microcomputer 10 inactivates the data signal $\overline{\text{DSTB}}$ 71 so as to notify the termination of the burst access to the instruction/data memory 20.

On the other hand, in the case that the instruction memory 20 is composed of a DRAM, when there occurs a cause of terminating (or inserting a wait into) the burst access because of a refresh operation from an external device, the wait signal $\overline{\text{WAIT}}$ 73 is activated, so that the microcomputer 10 postpones its sampling of the data.

In the shown embodiment, the burst request signal BSTR 72 can be used as a chip select signal for a memory which is provided in the instruction/data memory 20 and which supports the burst access, and an inverted signal of the burst request signal BSTR 72 can be used as a chip select signal for a memory which is provided in the instruction/data memory 20 but which does not support the burst access.

In the above mentioned embodiment, since there is provided the means for selecting either the single access or the burst access for one memory region or each of a plurality of memory regions, it is no longer necessary to receive a burst access acknowledge signal from an external memory. Therefore, the single access and the burst access can be controlled by only one control signal (BSTR in the above mentioned embodiment) which is a signal outputted from the microcomputer 10 and indicating the kind of the access.

In addition, the conventional example mentioned hereinbefore is so configured that a result of an external decoding of an address in response to the burst request signal is fed back to the microcomputer as the burst acknowledge signal. In this embodiment, however, since the microcomputer internally includes the access mode designation means and therefore internally discriminates the kind of the access a transfer and reception of a signal between an external and the microcomputer in connection with the kind of the access to be executed, is no longer necessary. In addition, since the kind of the access can be discriminated before the address is outputted from the microcomputer, it is possible to greatly reduce the control time in comparison with the conventional example. Therefore, it is very effective in increasing the system operating frequency and in reducing the number of clocks in the access cycle.

Now, a second embodiment of the data processing system will be described with reference to FIG. 6, which is a block diagram of a second embodiment of the data processing system in accordance with the present invention, capable of performing the burst access.

Figure 6:
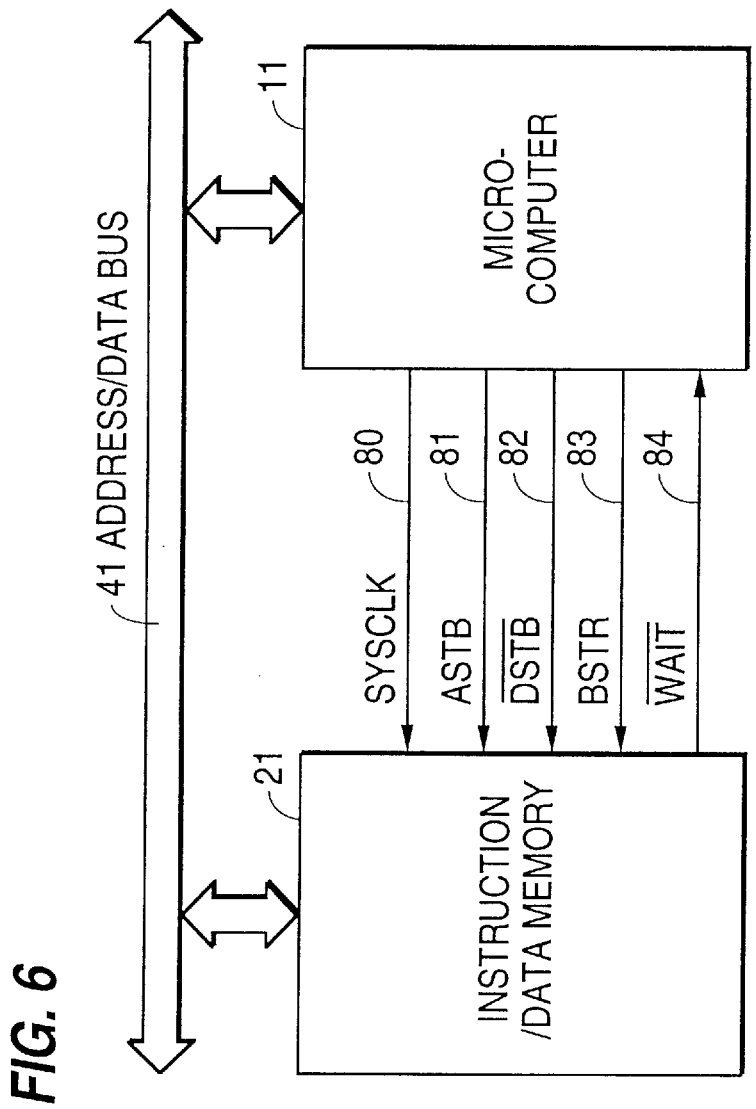
FIG. 6 is a block diagram of a second embodiment of the data processing system in accordance with the present invention, capable of performing the burst access.

As seen from comparison between FIGS. 3 and 6, the second embodiment is different from the first embodiment in which an address bus and a data bus is multiplexed in the second embodiment.

Referring to FIG. 6, the second embodiment includes a microcomputer 11 and an instruction/data memory 21 coupled to an address/data bus 41. The microcomputer 11 outputs to the instruction/data memory 21 a system clock SYSCLK 80, an address strobe signal ASTB 81, a data strobe signal $\overline{\text{DSTB}}$ 82, and a burst request signal BSTR 72, and receives a wait signal $\overline{\text{WAIT}}$ 84 from the instruction/data memory 20.

In the second embodiment, the microcomputer 11 internally includes an access mode designation register 100 explained in connection with the first embodiment and shown in FIG. 4.

Now, explanation will be made on operation when the burst access is designated by the access mode designation register 100, with reference to FIG. 7 which is a timing chart illustrating an operation in the burst access mode in the second embodiment of the data processing system shown in FIG. 6.

Figure 7:
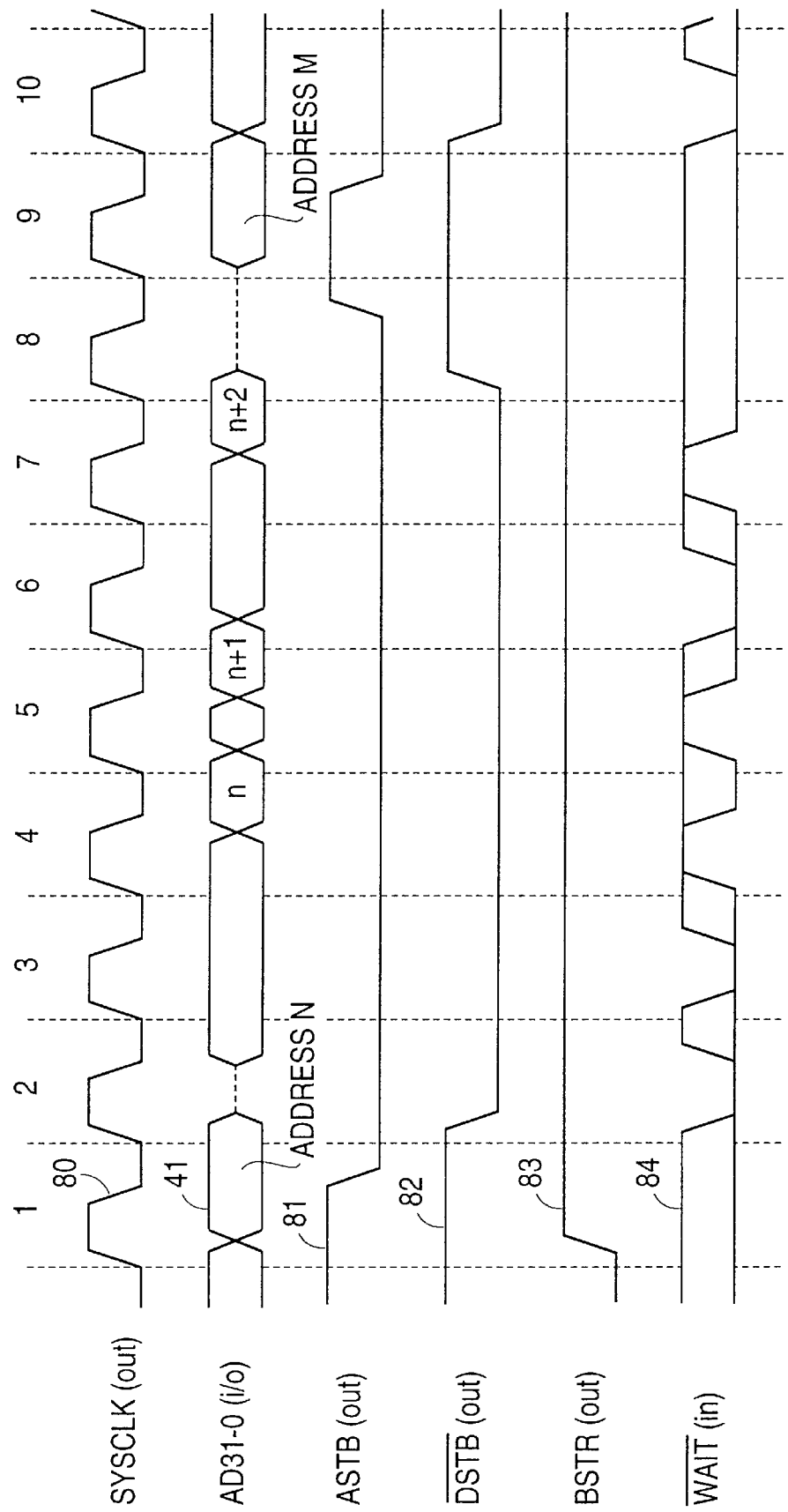
FIG. 7 is a timing chart illustrating an operation in the burst access mode in the second embodiment of the data processing system shown in FIG. 6.

In FIG. 7, SYSCLK shows the system clock 80, and AD31-0 designates an address or data on the address/data bus 40. ASTB is the address strobe signal 81 indicating the latch timing for the address, and $\overline{\text{DSTB}}$ is the data strobe signal 82 requesting the instruction/data memory 21 to output an instruction or data. BSTR shows the burst request signal 83 activated at the time of the burst access and inactivated at the time of the single access. $\overline{\text{WAIT}}$ indicates the wait signal 84 for inserting a wait into the data access timing.

The parenthesized "in", "out" and "i/o" in FIG. 7 shows the direction of a signal viewed from the microcomputer 11. Namely, the parenthesized "in" shows a signal supplied to the microcomputer 11, and the parenthesized "out" shows a signal outputted from the microcomputer 11. The parenthesized "i/o" shows a signal which is supplied to the microcomputer 11 in some situations and is outputted from the microcomputer 11 in other situations.

In the second embodiment, the address strobe signal ASTB 81 is added in comparison with the first embodiment, in order to latch the address, since the address bus and the data bus are multiplexed.

Referring to FIG. 7, in a state 1, an "address N" is outputted to the address/data bus AD31-0 41, and also, the address is latched in the instruction/data memory 21 at a falling edge of the address strobe signal ASTB 81.

In addition, in the state 1, the burst request signal BSTR 83 is activated so as to notify to the instruction/data memory 21 that the access in this cycle is the burst access.

When a preparation for complying with the burst access has been completed in the instruction/data memory 21 (in a state 4 in the example of FIG. 7), the wait signal $\overline{\text{WAIT}}$ 84 is inactivated so that an instruction "n" is outputted onto the address/data bus 41.

In the microcomputer 11, since it is inhibited to sample an instruction on the address/data bus 41 while the wait signal $\overline{\text{WAIT}}$ 84 is active, a first instruction "n" is transferred to the microcomputer 11 for the first place in the state 4 in which the wait signal $\overline{\text{WAIT}}$ 84 is inactivated.

In a state 5, since the wait signal $\overline{\text{WAIT}}$ 84 is made inactive, a next instruction "n+1" is transferred continuously.

In a state 6, since the instruction/data memory 21 had become incapable of supplying the instructions, the wait signal $\overline{\text{WAIT}}$ 84 is activated, so that the microcomputer 11 is put into a wait condition.

In a state 7, the instruction/data memory 21 becomes capable of supplying the instructions, the wait signal $\overline{\text{WAIT}}$ 84 is inactivated (namely brought to a high level), and a further next instruction "n+2" is transferred.

In a state 8, a cause of terminating the burst access occurs in the microcomputer 11, and therefore, the data strobe signal $\overline{\text{DSTB}}$ 82 is inactivated so as to notify termination of the burst access to the instruction/data memory 21.

In response to the inactivated data strobe signal $\overline{\text{DSTB}}$ 82, the instruction/data memory 21 terminates the transfer in the state 8. On the other hand, the address strobe signal ASTB 81 is brought to the high level, so that a next access cycle is made ready.

In a state 9, a "next address M" is outputted to the address/data bus AD31-0 41, so that a next burst access is started.

Thus, when the internal prefetch buffer (not shown) of the microcomputer 11 is no longer empty, or when a cause for terminating the burst access occurs as the result of execution of a branch instruction, the microcomputer 11 inactivates the data strobe signal $\overline{\text{DSTB}}$ 82 so ads to notify the termination of the burst access to the instruction/data memory 21.

On the other hand, in the case that the instruction memory 21 is composed of a DRAM, when it becomes incapable of supplying the instruction or data because of a refresh operation from an external device, namely, when there occurs a cause of terminating (or inserting a wait into) the burst access, the wait signal $\overline{\text{WAIT}}$ 84 is activated, so that the microcomputer 11 postpones its sampling of the data.

In addition, the burst request signal BSTR 83 can be used as a chip select signal for a memory which is provided in the instruction/data memory 21 and which supports the burst access, and an inverted signal of the burst request signal BSTR 83 can be used as a chip select signal for a memory which is provided in the instruction/data memory 21 but which does not support the burst access.

As mentioned above, since the data processing system in accordance with the present invention includes the means for selecting either the single access or the burst access for one memory region or each of a plurality of memory regions; it is no longer necessary to receive a burst access acknowledge signal form an external memory. Therefore, the single access and the burst access can be controlled by only one control signal which is a signal outputted from the microcomputer and indicating the kind of the access.

Therefore, differently from the conventional example mentioned hereinbefore so configured that a result of an external decoding of an address in response to the burst request signal is fed back to the microcomputer as the burst acknowledge signal, the data processing system in accordance with the present invention includes the access mode designation means provided in the microcomputer internally so that internally in the microcomputer it is possible to discriminate the kind of the access, namely, the single access or the burst access. Accordingly, a transfer and reception of a signal between an external device and the microcomputer in connection with the kind of the access to be executed, is no longer necessary.

Furthermore, since the kind of the access can be discriminated before the address is outputted from the microcomputer, it is possible to greatly reduce the control time in comparison with the conventional example. Therefore, it is very effective in increasing the system operating frequency and in reducing the number of clocks in the access cycle. Therefore, the data processing system in accordance with the present invention can make easy the timing design of a system using a microcomputer having a high operating frequency.

In the data processing system in accordance with the present invention, furthermore, the means for storing the kind of the access, the single access or the burst access, is composed of a register whose content can be set by a transfer instruction (store instruction) executed by the CPU. Therefore, the present invention needs neither a change of the instruction set for the CPU nor a special modification of the CPU itself.

In the data processing system in accordance with the present invention, furthermore, the number of control terminals of the microcomputer can be reduced by one, and therefore, the package size can be reduced.

In the data processing system in accordance with the present invention, additionally, since the address decoder is provided internally in the microcomputer, an external circuit can be reduced, and therefore, it is possible to reduce the package area of the system. As a result, the cost and the consumed electric power of the system can be decreased.

In the data processing system in accordance with the present invention, a memory system is divided into a plurality of memory blocks each having the same memory size so that a memory which supports the burst access and a memory which does not support the burst access can constitute different memory blocks, and the kind of access is designated for each of the plurality of memory blocks. Therefore, it is possible to make easy the design of a memory system mixedly including a DRAM which supports the burst access and an SRAM and a ROM which do not support the burst access, and also it is possible to quicken the access.

The invention has thus been shown and described with reference to the specific embodiments. However, it should be noted that the present invention is in no way limited to the details of the illustrated structures and that changes and modifications may be made within the scope of the appended claims.

I claim:

1. A data processing system having a microcomputer and a memory means coupled thereto, said memory means having a single access mode in which one item of data is outputted in response to reception of one address and a burst access mode in which a plurality of items of data are continuously outputted in response to reception of a burst request signal and one address, a memory region of said memory means being divided into a plurality of memory blocks, said microcomputer comprising:

a register for storing, for each of said memory blocks, information indicating whether burst access mode is available for a corresponding memory block;

an address decode means for receiving an address to be supplied to said memory means, and for outputting a decode signal indicative of which of said plurality of memory blocks corresponds to a memory region to be accessed by said address to be supplied to said memory means; and means for activating said burst signal to be supplied to said memory means, when said information stored in said register designated by said decode signal indicates that burst access is available for said memory means.

2. A data processing system as claimed in claim 1, wherein said address decode means receives an internal address signal on an internal address bus, for selecting one of said plurality of memory blocks.

3. A data processing system as claimed in claim 1, wherein a content of said register is set by execution of a predetermined instruction by a central processing unit.

4. A data processing system as claimed in claim 1, wherein said microcomputer outputs to said memory means said burst request signal for requesting the burst access mode and a data request signal for requesting said memory means to output data, and wherein said microcomputer receives from said memory means a signal indicating that data is established on a data bus.

5. A data processing system as claimed in claim 1, wherein said microcomputer includes a plurality of AND gates each receiving information stored in said register and a corresponding decode signal from said address decode means, and an OR gate receiving an output of all said AND gates for outputting said burst request signal.

6. A data processing system as claimed in claim 1, wherein when said burst request signal is inactive, said microcomputer accesses said memory means in said single access mode.

7. A data processing system as claimed in claim 1, wherein said memory means includes a first memory which supports the burst access mode and a second memory which does not support the burst access mode, and wherein the memory region of said memory means is divided into a plurality of different memory blocks having a predetermined size, and wherein said burst request signal is used as a chip select signal for said first memory which supports the burst access mode, and wherein an inverted signal of said burst request signal is used as a chip select signal for said second memory which does not support the burst access mode.

* * * * *